Aug. 31, 1926.
C. E. DAILEY
1,598,425
ADJUSTABLE PULLEY
Filed June 22, 1925
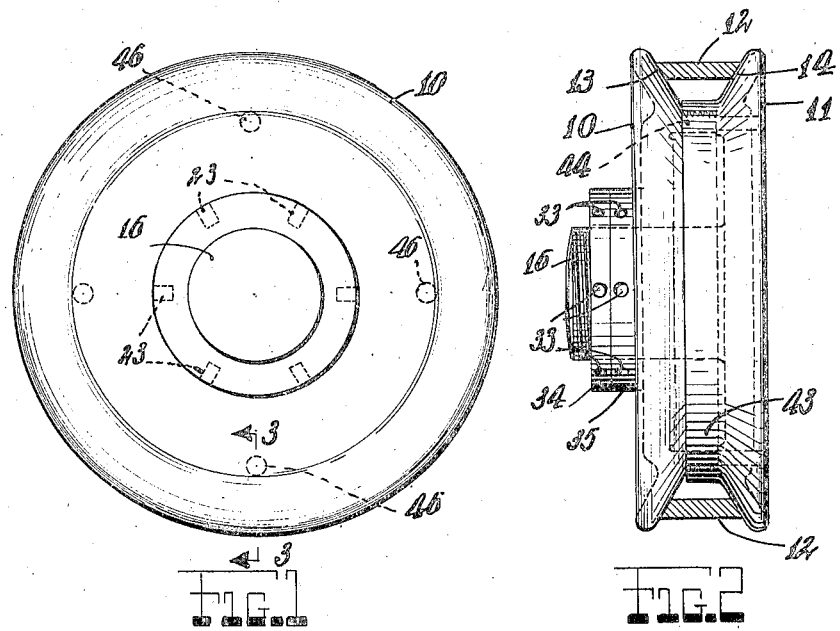
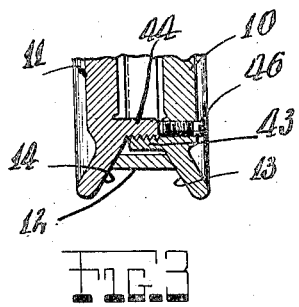
INVENTOR.
Carolus E. Dailey
BY
ATTORNEY Patented Aug. 31, 1926.

1,598,425

UNITED STATES PATENT OFFICE.

CAROLUS E. DAILEY, OF BROOKLYN, NEW YORK

ADJUSTABLE PULLEY.

Application filed June 22, 1925. Serial No. 38,636.

This invention relates to improvements in pulleys, and it is the principal object of the invention to provide an expansion pulley which can readily be adjusted to any width of belt.

Another object of the invention is the provision of an expansion pulley having novel and improved means for holding the two supplementary homogeneous pulley members apart.

A further object of the invention is the provision of a pulley of this character of simple construction, inexpensive to manufacture, and equipped with novel and improved means for holding the two parts of the pulley assembled.

These and other objects and advantages of my invention will become more fully known as the description thereof proceeds, and will then be more specifically defined in the appeneded claims.

In the accompanying drawing, forming a material part of this disclosure:

Fig. 1 is a side elevation of an expansible pulley constructed according to the present invention.

Fig. 2 is an edge view of the same.

Fig. 3 is a fragmentary sectional view taken on the line 3—3 of Fig. 1.

The pulley illustrated in Figures 1 and 2, comprises two identically constructed members 10 and 11 having bevelled inner edges 13 and 14 facing each other to form a central groove in which the belt 12 travels. The two members are supported on a shaft 16 on which member 11 is fast or formed integrally therewith and carrying at its outer threaded end projecting beyond member 10, a pair of threaded discs 34 and 35 provided with openings 33 for the engagement by a tool for gripping. Both members 10 and 11 are equipped with inner oppositely directed flanges 43 and 44. The flange 43 is provided with female threads while the flange 44 with engaging male threads, and set screws 46 allow an adjustment of the said members, closer together or farther apart.

It will be clear that such changes may be made in my invention as fall within the scope of the appended claims without departure from the spirit of the invention.

Having thus described my invention what I claim as new and desire to secure by Letters Patent is as follows:

1. An expansion pulley comprising two oppositely disposed members, having inner bevelled edges forming a groove for the guidance of a belt, inner oppositely directed flanges threadedly engaging each other, and means for locking the members in adjusted positions, characterized by set screws in one of said members bearing against the other of said members.

2. An expansion pulley comprising two oppositely disposed members, having inner bevelled edges forming a groove for the guidance of a belt, inner oppositely directed flanges threadedly engaging each other, one of said members being integral with a shaft, the other of said members being abutted by locking discs co-acting with said shafts, and auxiliary means for locking the members in adjusted positions, characterized by set screws in one of said members bearing against the other of said members.

In testimony whereof I have affixed my signature.

CAROLUS E. DAILEY.